United States Patent
Sun et al.

(10) Patent No.: US 8,537,803 B2
(45) Date of Patent: Sep. 17, 2013

(54) SYNCHRONIZED CHANNEL ACCESS IN COEXISTING WIRELESS NETWORKS

(75) Inventors: Yanjun Sun, Richardson, TX (US); Ariton E. Xhafa, Plano, TX (US); Xiaolin Lu, Plano, TX (US); Josef Peery, Ra'anana (IL)

(73) Assignee: Texas Instruments Incorporated, Dallas, TX (US)

( * ) Notice: Subject to any disclaimer, the term of this patent is extended or adjusted under 35 U.S.C. 154(b) by 607 days.

(21) Appl. No.: 12/559,853

(22) Filed: Sep. 15, 2009

(65) Prior Publication Data

US 2010/0067516 A1 Mar. 18, 2010

Related U.S. Application Data

(60) Provisional application No. 61/097,056, filed on Sep. 15, 2008.

(51) Int. Cl.
*H04J 3/06* (2006.01)

(52) U.S. Cl.
USPC .......................................................... 370/350

(58) Field of Classification Search
USPC .................................. 370/350, 328, 324
See application file for complete search history.

(56) References Cited

U.S. PATENT DOCUMENTS

| | | | | |
|---|---|---|---|---|
| 6,590,860 | B1* | 7/2003 | Sakoda et al. | 370/203 |
| 6,600,726 | B1* | 7/2003 | Nevo et al. | 370/278 |
| 7,546,142 | B2* | 6/2009 | Ginzburg et al. | 455/552.1 |
| 8,099,669 | B2* | 1/2012 | Nixon et al. | 715/752 |

* cited by examiner

*Primary Examiner* — Mark Rinehart
*Assistant Examiner* — Mohammad Anwar
(74) *Attorney, Agent, or Firm* — Alan A. R. Cooper; W. James Brady, III; Frederick J. Telecky, Jr.

(57) ABSTRACT

A system and method for arbitrating channel access in a wireless device including co-located network transceivers are disclosed herein. A wireless device includes a first wireless transceiver and a second wireless transceiver. The first transceiver is configured for operation with a first wireless network. The second transceiver is configured for operation with a second wireless network. The wireless device further includes logic that determines which of the first and second transceivers is enabled to transmit at a given time. The logic causes the first transceiver to transmit a notification signal indicating a time period during which the second transceiver of the wireless device will perform a first wireless transaction, and during which, based on receiving the notification signal, a different wireless device performs a second wireless transaction via the second wireless network without transmitting a notification signal.

35 Claims, 4 Drawing Sheets

SYNCHRONIZED CHANNEL ACCESS IN COEXISTING WIRELESS NETWORKS

CROSS-REFERENCE TO RELATED APPLICATIONS

This application is a non-provisional application claiming priority to provisional application Ser. No. 61/097,056, filed on Sep. 15, 2008, entitled "Channel Utilization Via Bluetooth Activities Synchronization In Coexisting Wireless Networks," the teachings of which are incorporated by reference herein.

BACKGROUND

As wireless technologies proliferate, mobile wireless devices incorporate a multiplicity of different wireless standards. For example, a cellular telephone can accommodate a cellular network (e.g., Universal Mobile Telecommunications System), a wireless local area network ("WLAN"), such as IEEE 802.11, and a wireless personal area network ("WPAN") (e.g., Bluetooth). Including WPAN access makes utilization of a wireless device more convenient by allowing use of wireless headsets and other short-range wireless appliances.

Some of the various wireless standards adopted for use in mobile devices use adjacent and/or overlapping portions of the wireless spectrum. For example, both Bluetooth and IEEE 802.11b/g/n occupy the 2.45 GHz band.

SUMMARY

A system and method for arbitrating channel access in a wireless device including co-located network transceivers is disclosed here. In some embodiments, a wireless device includes a first wireless transceiver and a second wireless transceiver. The first transceiver is configured for operation with a first wireless network. The second transceiver is configured for operation with a second wireless network. The wireless device further includes logic that determines which of the first and second transceivers is enabled to transmit at a given time. The logic causes the first transceiver to transmit a notification signal indicating a time period during which the second transceiver of the wireless device will perform a first wireless transaction, and during which, based on receiving the notification signal, a different wireless device performs a second wireless transaction via the second wireless network without transmitting a notification signal.

In accordance with at least some other embodiments, a method includes receiving, by a first wireless device via a first transceiver configured for operation on a first wireless network, a notification signal transmitted on the first network by a second wireless device. The notification signal indicates a time period during which the second wireless device will perform a wireless transaction on a second wireless network. A second transceiver of the first wireless device is enabled, based on receipt of the notification signal, to perform a different wireless transaction on the second wireless network during the time period specified in the received notification signal. The first wireless device performs the different wireless transaction absent a corresponding notification signal transmission by the first wireless device.

In accordance with yet other embodiments, a wireless device includes a first wireless transceiver, a second wireless transceiver, and an arbiter. The first wireless transceiver is configured for communication via a first wireless network. The second wireless transceiver is configured for communication via a second wireless network. The arbiter controls which of the first and second transceivers is enabled to transmit at a given time. The arbiter schedules wireless transactions via the second transceiver based on timing signals wirelessly received via the first transceiver.

In accordance with further embodiments, a wireless device includes a first wireless transceiver, a second wireless transceiver, and synchronization logic. The first transceiver is configured for operation with a first wireless network. The second transceiver is configured for operation with a second wireless network. The synchronization logic receives a timing signal transmitted via the first wireless network and synchronizes transactions via the second transceiver to the timing signal.

In accordance with additional embodiments, a method includes receiving, by a first wireless device via a first transceiver configured for operation on a first wireless network, a timing signal transmitted on the first network. A second transceiver of the first wireless device configured for operation on a second wireless network is synchronized to the received timing signal.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
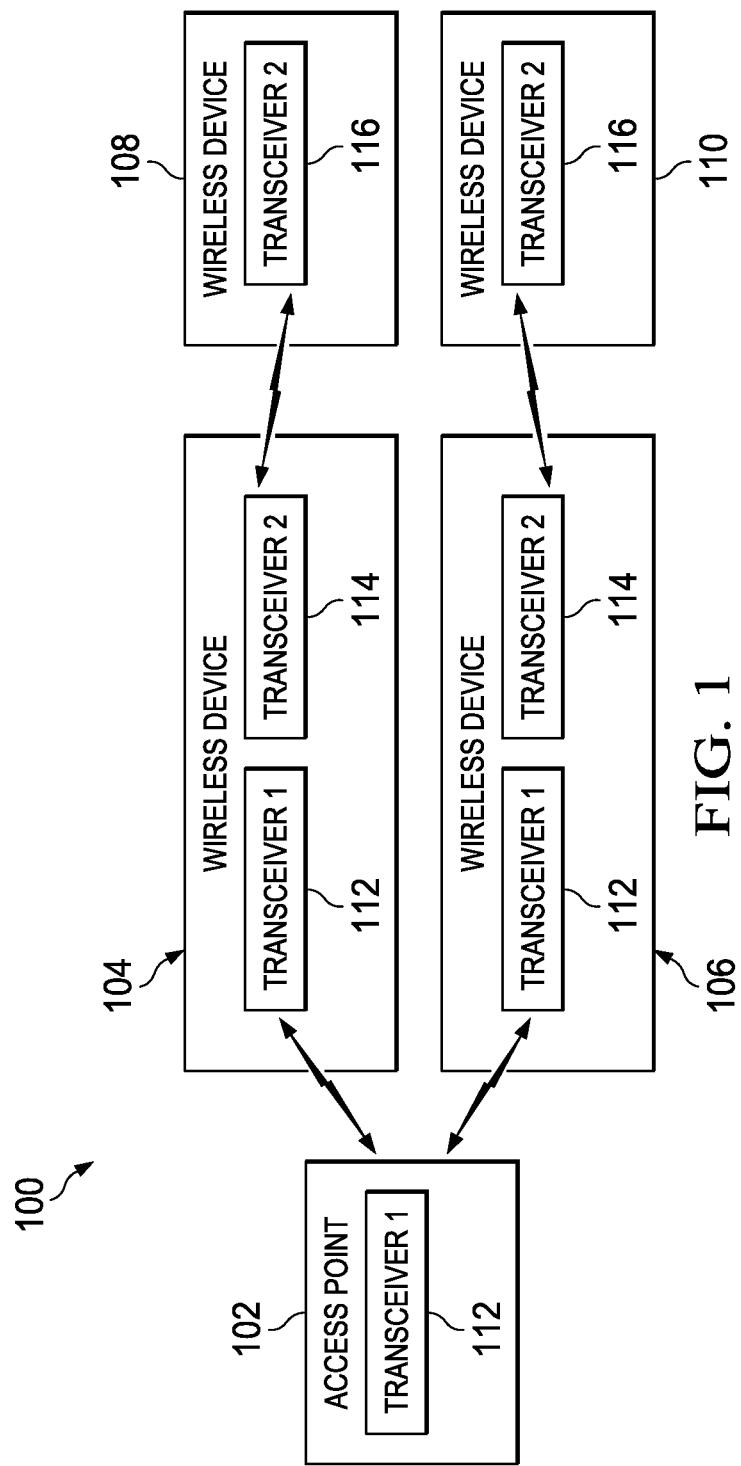
FIG. 1 shows a wireless system including wireless devices that use two interfering wireless networks in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection, or through an indirect electrical connection via other devices and connections. Further, the term "software" includes any executable code capable of running on a processor, regardless of the media used to store the software. Thus, code stored in memory (e.g., non-volatile memory), and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Disclosed herein are a system and method for scheduling access to a wireless transmission channel in a system that includes wireless devices using multiple conflicting wireless networks. Mobile wireless devices are sometimes capable of accessing multiple exclusive wireless networks. Such wireless networks can occupy adjacent or overlapping frequency spectrum. For example, Bluetooth and IEEE 802.11b/g/n both utilize the 2.4-2.5 GHz band. Access to the networks can be coordinated via time multiplexing to reduce performance degradation caused by collisions that may occur when the networks are simultaneously accessed. Network performance degradation can also result when a mobile device is transmitting via a first network (e.g., Bluetooth) when another network device transmits a packet to the mobile device via a second network (e.g., a WLAN). The mobile device will be unable to transmit an acknowledge signal because channel access is reserved for transmission via the first network. Consequently, the device transmitting via the second network may conclude that the packet was lost and reduce the transmission rate of subsequent packets. The longer transmission interval resulting from the reduced rate may further increase the number of collisions with transmissions via the first network at the mobile device, ultimately resulting in progressive performance degradation (i.e., an avalanche effect).

One method avoiding such progressive deterioration of performance involves transmission of a signal notifying network devices that they are not allowed to transmit during a duration specified by the signal. For example, in a system included devices having co-located Bluetooth and WLAN transceivers, a device planning a Bluetooth transmission may transmit a notification signal (e.g., a CTS2SELF frame) via the WLAN to inform other WLAN devices to avoid any transmission during the upcoming Bluetooth transmission. CTS2SELF is a self-addressed packet containing a duration field specifying transceiver is configured to perform transactions (e.g., transmit or receive) via the second transceiver in synchronization with a second transceiver of a different wireless device a time duration during which WLAN devices other than the transmitting device are not allowed to transmit any packets. WLAN devices receiving the CTS2SELF packet inhibit WLAN transmissions in accordance with the duration field. Unfortunately, the time available for WLAN access may be reduced in correspondence to the number of devices in a wireless network using such a notification method.

Notification signaling, as described above may not be wholly effective at preventing progressing performance degradation. If a first mobile device transmits a notification signal, a second mobile device wishing to transmit a notification signal during the WLAN exclusion interval will be unable to do so. If the second device thereafter transmits via Bluetooth, the transmission will be unprotected, and another wireless device may transmit a packet via WLAN to the second device during the Bluetooth transmission resulting in the progressive performance degradation (avalanche effect) described above.

Embodiments of the present disclosure employ a distributed scheduling algorithm to alleviate progressive performance degradation in networks utilizing devices having co-located network transceivers configured for operation in wireless networks that may interfere with one another.

FIG. 1 shows an embodiment of a wireless system including wireless devices configured to use two different wireless networks that may interfere with one another when simultaneously accessed. The wireless system 100 includes an access point 102, wireless devices 104 and 106, and wireless devices 108 and 110. The access point 102, and the wireless devices 104, 106 each include a wireless transceiver 112. The wireless transceiver 112 allows the access point 102 and the wireless devices 104, 106 to communicate via a first wireless network, for example, a WLAN (e.g., IEEE 802.11b/g/n). The wireless devices 104, 106 also each include a second wireless transceiver 114. The second wireless transceiver 114 allows the wireless devices 104, 106 to communicate via a second wireless network, for example, a WPAN (e.g., Bluetooth). The wireless devices 108, 110 each include a transceiver 114 for communicating via the second wireless network. In practice, the system 100 may include any number of wireless devices 104, 106, 108, 110. Exemplary mobile wireless devices 104, 106 include cellular telephones, personal digital assistants, personal computers, navigation devices, personal music players, video gaming systems, etc. Exemplary mobile wireless devices 108, 110 include wireless headsets, wireless earphones, etc.

The access point 102 can also be referred to as a base station, a node B, etc. The access point 102 may connect the wireless devices 104, 106 to a wired network, serve as an intermediary for communication between the wireless devices 104, 106, and/or provide other networking services (e.g., timing services) to the wireless devices 104, 106. Some embodiments of the system 100 can employ ad-hoc networking, and may not include the access point 102. Instead, in such embodiments, the mobile wireless devices 104, 106 can communicate directly with one another.

The first wireless network is incompatible with the second wireless network in that the wireless technologies and/or protocols used by the second network do not allow for wireless communications via the first network. The frequency bands used by the second network can be adjacent to or overlap the frequency bands used by the first network. Consequently, operation of the first network can interfere with operation of the second network by directly interfering with transmissions in overlapping bands or by out-of-band emissions that saturate receivers or interfere with transmissions in adjacent frequency bands.

To reduce interference between the first and second networks, the wireless devices 104, 106 may transmit a notification signal via the first network (using transceivers 112). The notification signal requires other devices using the first network (e.g., access point 102, devices 104, 106) to refrain from transmitting via the first network during the specified in the notification signal (e.g., second network transmission interval).

As explained above, some embodiments of such a notification methods may reduce access time available to the first network and/or leave the first network susceptible to progressive performance degradation. Embodiments of the present disclosure employ a distributed scheduling algorithm that makes use of the aforementioned notification signaling while improving first network access time and reducing the likelihood of performance degradation due to the avalanche effect.

Embodiments of the wireless devices 104, 106 synchronize activities on the second wireless network such that a single notification signal transmitted by either of the wireless devices 104, 106 can provide protection for both devices 104, 106. Configuring the wireless devices 104, 106 to access the second network based on a notification signal transmitted by any other wireless device 104, 106 in the first network reduces the number of notification signals transmitted via the first network. Moreover, second network transmissions are protected by the exclusive channel access interval provided by the notification signal, thereby reducing the incidence of avalanche effect.

Figure 2:
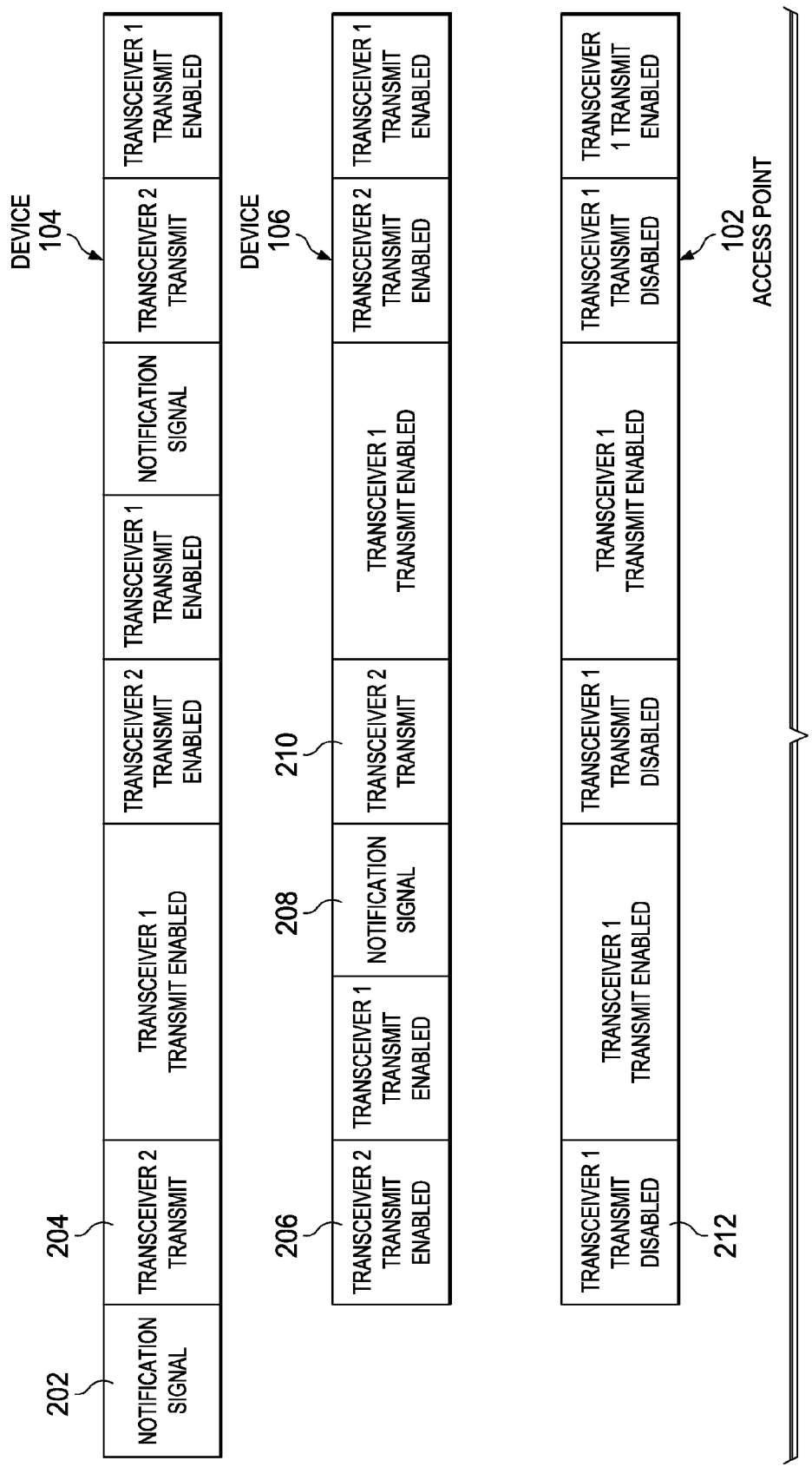
FIG. 2 shows a diagram of signals transmitted in a wireless system including network arbitration based on channel access control/notification signals in accordance with various embodiments.

FIG. 2 shows a diagram of signals transmitted in the wireless system 100 including network arbitration based on channel access notification signals in accordance with various embodiments. The wireless device 104 is ready to transmit data to the wireless device 108 via transceiver 114. To gain exclusive access to the channel for transmission, the wireless device 104 transmits a notification signal 202 via the transceiver 112 on the first network. The notification signal requires the access point 102 and the wireless device 106 to refrain from transmitting via transceivers 112 during a time period specified by the notification signal 202.

The wireless device 104 transmits 204 via transceiver 114 at the time specified via the notification signal 202. Moreover, the wireless device 106 may also enable its transceiver 114 to transmit 206 during the specified time interval. Thus, any second network transmissions from wireless device 106 are protected by the notification signal 202 transmitted by wireless device 104. The access point 102 refrains from transmitting 212 during the specified interval.

Notification signal transmissions by the wireless devices 104, 106 may be randomized to reduce the likelihood of collisions. If one wireless device (e.g., 106) receives a notification signal transmitted by another wireless device (e.g., 104) while a notification signal transmission is pending in the wireless device 106, then the wireless device 106 discards the pending notification signal transmission and may transmit in the second network during the interval specified by the received notification signal.

Allowing multiple wireless devices 104, 106 to simultaneously transmit via the second network may increase the possibility of collisions. However, if the second network employs a frequency hopping spread spectrum technique (e.g., as in Bluetooth), the likelihood of collisions is reduced. To further reduce the probability of collisions, some embodiments divide devices including co-located transceivers 112, 114 into a plurality of groups. The devices in a group are synchronized and responsive to notification signals transmitted by other devices in the group. By grouping devices in this manner, the number of devices in a group is reduced thereby lessening the possibility of collision when the second network includes many devices.

Following the network 2 transmission interval 204, the access point 102 and the wireless devices 104, 106 enable transmission via transceivers 112 on the first network. The wireless devices 104, 106 may also schedule transmission of a notification signal for a random time following the transmit interval 204. In FIG. 2, the notification signal 208 is transmitted by the wireless device 106. The access point 102 and the wireless device 104 receive the notification signal 208. As explained above, in response to the notification signal 208, transmissions on the first network are disabled and wireless devices 104, 106 are enabled to transmit 210 on the second network during the interval specified by the notification signal 208.

Embodiments of the wireless devices 104, 106 synchronize activities performed via the second network. Synchronization may be achieved without any involvement of the wireless devices 108, 110. Some embodiments apply timing information provided via the first network to synchronize activities on the second network. For example, an IEEE 802.11b/g/n access point 102 transmits special frames called beacons that contain a copy of the access point's Timing Synchronization Function ("TSF"). The TSF is used synchronize wireless devices associated (e.g., in a basic service set) with the access point 102. Using the TSF, the transceivers 112 of wireless devices 104, 106 are able to share the same clock.

Embodiments of the wireless devices 104, 106 employ the shared clock to synchronize the activities of the second network. In some embodiments, a clock used by the transceiver 114 of the wireless devices 104, 106 is synchronized with the clock shared via the first network transceivers 112. Certain second network transmissions (e.g., high priority period data transfers) may be scheduled to occur at predetermined intervals of the shared clock. For example, such transmissions may be scheduled for multiples of 3.75 milliseconds, which is the length of six Bluetooth slots, or other intervals as required for periodic traffic.

As explained above, transmission of notification signals (e.g., 202, 208) by the wireless devices 104, 106 is randomized to reduce collisions. When second network activities are synchronized, randomization can be provided, for example, by adding a random backoff to the scheduled notification signal transmission.

Figure 3:
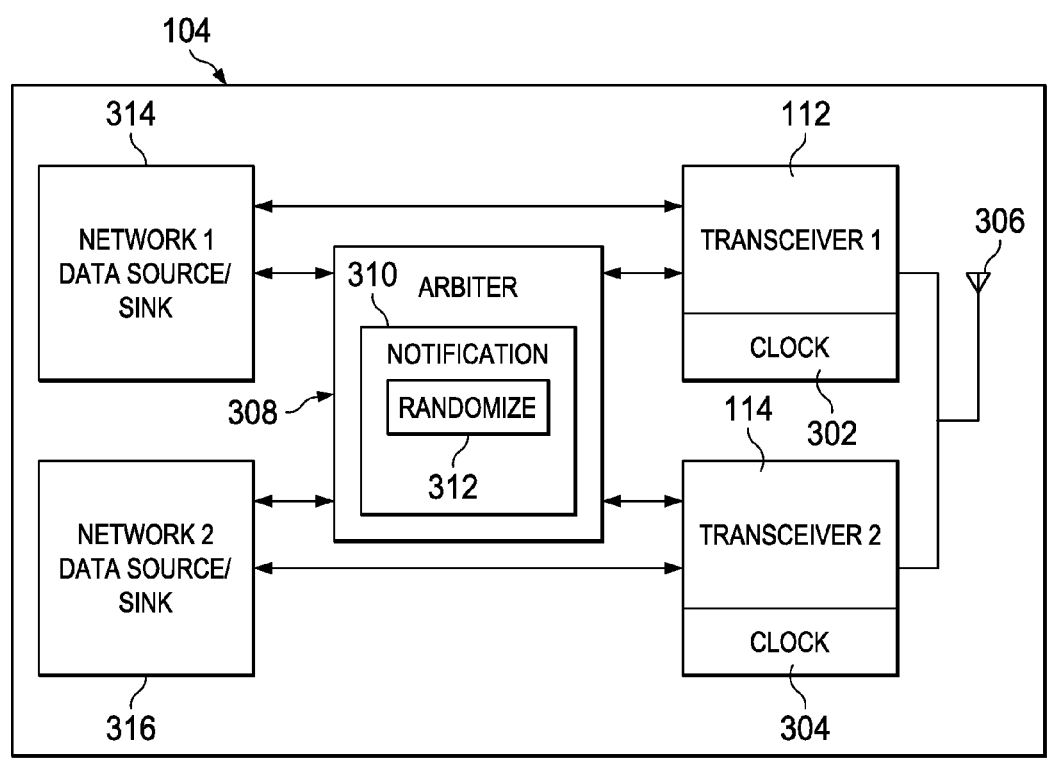
FIG. 3 shows a block diagram of a wireless device including network arbitration that synchronizes activities on the second transceiver based on timing signals received from the first transceiver and that controls transmission based on channel access notification signals in accordance with various embodiments.

FIG. 3 shows a block diagram of a wireless device 104 configured for network arbitration based on channel access notification signals in accordance with various embodiments. The wireless device 104 includes the transceiver 112 configured for communication via the first network and the transceiver 114 configured for transmission via the second network. The transceiver 112 is associated with a clock 302, and the transceiver 114 is associated with a clock 304. The transceivers 112, 114 are coupled to one or more antennas 306. In some embodiments, the transceivers 112, 114 are coupled to one or more different antennas.

The wireless device 104 also includes an arbiter 308 coupled to the transceivers 112, 114. The arbiter determines which of the transceivers 112, 114 is allowed to access the transmission channel (e.g., allowed to transmit) at a given time. The arbiter 308 includes notification module 310 that schedules transmission of a notification signal 202. The randomize module 312 adjusts (i.e., randomizes) the scheduled transmission time of a notification signal 202 to reduce collisions.

Transceiver 1 112 receives timing information transmitted by a timing source on the first network (e.g., access point 102). The timing information is used to synchronize clock 302 to with other clocks in the first network. Clock 304 associated with transceiver 2 114 may be synchronized with clock 302 to provide synchronization of clocks in the second network.

The network 2 data source/sink 316 provides data to transceiver 2 114 for transmission on the second network. When data is prepared for transmission, the data source/sink 316 informs the arbiter 308. The arbiter 308 schedules transmission of a notification signal 202 via transceiver 1 112. The notification signal 202 specifies a time and duration for packet transmission or receipt on the second network. Following transmission of the notification signal 202, the arbiter grants exclusive channel access rights to transceiver 2 114 for the time interval specified in the notification signal 202. When the specified time interval elapses, the arbiter 308 allows transceiver 1 112 to transmit or receive.

Similarly, when a notification signal 208 is received by transceiver 1 112, the arbiter 308 disables transceiver 1 112 from transmitting and may enable transmission by transceiver 2 114 for the time interval specified in the notification signal 208. If the arbiter 308 had previously scheduled transmission of a pending notification signal 202, the transmission is cancelled, if the duration specified in the received signal is long enough to provide the pending activity on transceiver 2 114, and another notification signal 202 transmission is scheduled for a randomized interval after the expiration of the time interval specified in the notification signal 208.

Various components of the wireless device 104, including at least some portions of the transceivers 112, 114, the clocks 302, 304, and the arbiter 308, can be implemented using a processor and software programming that causes the processor to perform the operations described herein. In particular, software programming can be used to cause a processor to provide synchronization of clocks 302, 304, generation and scheduling of notification signal transmission, and channel access arbitration based on notification signals including enabling transceiver 2 114 transmissions in response to a received notification signal. Suitable processors include, for example, general-purpose processors, digital signal processors, and microcontrollers. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems. Software programming can be stored in a computer readable medium. Exemplary computer readable media include semiconductor memory, optical storage, and magnetic storage.

Some embodiments can implement the functionality described herein using dedicated circuitry. Some embodiments may use a combination of dedicated circuitry and software executed on a processor. Selection of a hardware or software/processor implementation of embodiments is a design choice based on a variety of factors, such as cost and the ability to incorporate changed or additional functionality in the future.

Figure 4:
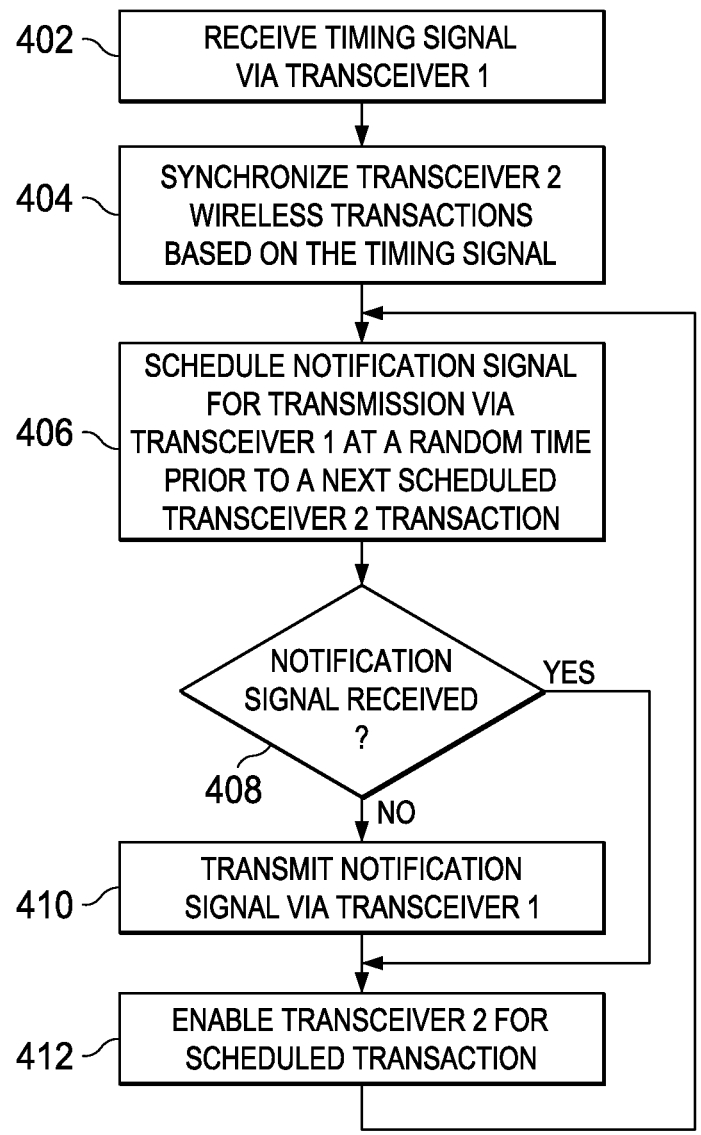
FIG. 4 shows a flow diagram for a method of network arbitration that synchronizes activities on the second transceiver based on timing signals received from the first transceiver and that controls transmission based on channel access notification signals in accordance with various embodiments.

FIG. 4 shows a flow diagram for a method of network arbitration that synchronizes activities on the second transceiver based on timing signals received from the first transceiver and that controls transmission based on channel access notification signals in accordance with various embodiments. Though depicted sequentially as a matter of convenience, at least some of the actions shown can be performed in a different order and/or performed in parallel. Additionally, some embodiments may perform only some of the actions shown. In some embodiments, the operations of FIG. 4, as well as other operations described herein, can be implemented as instructions stored in a computer readable medium and executed by a processor.

In block 402, a wireless device 104 including co-located network transceivers 112, 114 each configured for operation on different and incompatible wireless networks is configured to wirelessly communicate by time multiplexed operation of the transceivers 112, 114. Transceiver 1 112 receives timing information transmitted by a timing source in a first wireless network. In some embodiments, the wireless device 104 uses the timing information to synchronize a clock 302 in the wireless device 104 to the timing source. Thus, each device in the first network shares a common clock.

In block 404, the wireless device 104 synchronizes transceiver 2 114 transactions to the clock 302. The synchronization may be accomplished by synchronizing a clock 304 associated with transceiver 2 114 to the clock 302. With the synchronization of the clock 304, the wireless transaction activities of all wireless devices using the second network are synchronized. In some embodiments, periodic transactions via transceiver 2, 114 of a plurality of devices using the second network may by synchronized. Such synchronization may facilitate using a single notification signal to facilitate simultaneous second network transactions by multiple devices.

In block 406, the wireless device 104 has data to transmit to a wireless device 108 via the second network. To reserve communication channel access for transceiver 2 114, transmission of a notification signal 202 via transceiver 1 112 is scheduled for a random time shortly before the transaction via transceiver 2 is scheduled to begin. The notification signal 202 includes information defining a time duration during which other wireless devices (e.g., access point 102, wireless device 106) that are associated via the first network are required to refrain from transmitting on the first network.

In block 408, the wireless device 104 checks for reception of a notification signal 208 transmitted by different wireless device in the first network. If a notification signal 208 has been received, and the time duration specified by the notification signal is at least as great as the time required for the scheduled transceiver 2 transaction, then the wireless device 104 disables transmission via transceiver 1 112 for the duration specified in the notification signal 208, and enables transceiver 2 114 to perform the scheduled transaction on the second network in block 412. A notification message 202 pending for transmission in the wireless device 104 may be discarded based on reception of the notification signal 208.

If, in block 408, no notification message 208 has been received, then in block 410, the wireless device 104 transmits the notification signal via transceiver 1 112. Thereafter, transceiver 2 114 is enabled to perform the scheduled transaction on the second network in block 412.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A wireless device, comprising:
a first wireless transceiver and a second wireless transceiver, the first transceiver configured for operation with a first wireless network, and the second transceiver configured for operation with a second wireless network, the first wireless network and the second wireless network employing adjacent and/or overlapping portions of the wireless spectrum, wherein the first wireless network is incompatible with the second wireless network; and
logic that determines which of the first and second transceivers is enabled to transmit at a given time, wherein the logic is configured to:
a.) during a time period as triggered by and based on receiving a first notification signal of a selected type over the first wireless network from a different wireless device also having a first wireless transceiver configured for operation with the first wireless network and a second wireless transceiver configured for operation with the second wireless network, the first notification signal indicating a time period during which the second transceiver of the different wireless device will perform a first wireless transaction;

b.) wherein the wireless device is configured to perform a second wireless transaction via the second wireless network without transmitting a second notification signal of the selected type over the first wireless network, and c.) wherein the logic causes the second wireless transaction to occur during the time period during which the second transceiver of the other device will perform the first wireless transaction, as determined by the first wireless device from the first notification signal of the selected type.

2. The wireless device of claim 1, wherein the wireless device randomizes transmission of the notification signal.

3. The wireless device of claim 1, wherein the logic discards a pending notification signal transmission when a notification signal is received.

4. The wireless device of claim 3, wherein the logic schedules transmission of a notification signal for a random time before a wireless transaction via the second transceiver is scheduled to begin.

5. The wireless device of claim 1, wherein the wireless device is a member of a first group, and a system comprises the first group and a second group each group comprising a plurality of different wireless devices configured to communicate via the first and second wireless networks, and the notification signal affects second network transactions only of members of the first group.

6. The wireless device of claim 1, wherein the first transceiver wirelessly receives a timing signal and the logic synchronizes wireless transactions of the second transceiver to the timing signal.

7. The wireless device of claim 6, wherein a clock used by the second transceiver is synchronized to the received timing signal and the second transceiver is granted wireless transaction rights at a predetermined period based on the clock.

8. The wireless device of claim 1, wherein the second transceiver is a wireless personal area network (WPAN) transceiver and the first transceiver is a wireless wide area network transceiver.

9. The wireless device of claim 1, wherein the logic causes the first transceiver to transmit a third notification signal of the selected type indicating a time period during which the second transceiver of the wireless device will perform a third wireless transaction, wherein the first transaction, the second transaction, and the third transaction is a Bluetooth transaction.

10. The wireless device of claim 1, wherein the first network is a wireless local area network (WLAN), and the second network is a wireless personal area network (WPAN).

11. The wireless device of claim 10, wherein the WPAN is Bluetooth.

12. The wireless device of claim 1, wherein the selected notification signals are all CTS to self frames transmitted over the first network, wherein the first network is a WLAN.

13. The wireless device of claim 1, wherein the first wireless network uses the first transceiver to broadcast on a WLAN, and the second wireless network uses the second transceiver to broadcast on a Bluetooth network.

14. The wireless device of claim 1, wherein the first wireless transaction is a Bluetooth transaction, and the second wireless transaction is also a Bluetooth transaction.

15. The wireless device of claim 1, wherein the second network employs a frequency hopping spread spectrum technique to help lessen a possibility of collisions between wireless transmissions.

16. A method, comprising:
receiving, by a first wireless device via a first transceiver configured for operation on a first wireless network, a notification signal of a selected type transmitted on the first network by a second wireless device, the notification signal of the selected type indicating a time period during which the second wireless device will perform a wireless transaction on a second wireless network, the first wireless network and the second wireless network employing adjacent and/or overlapping portions of the wireless spectrum, wherein the first wireless network is incompatible with the second wireless network;

enabling, based on reception of the notification signal of the selected type, a second transceiver of the first wireless device to perform a different wireless transaction on the second wireless network during the time period specified in the received notification signal of the selected type without transmitting a second notification signal of the selected type over the first wireless network, wherein the first wireless device performs the wireless transaction absent a corresponding notification signal transmission by the first wireless device;

wherein the second wireless device has a first wireless transceiver configured for operation with the first wireless network and a second wireless transceiver configured for operation with the second wireless network, and wherein the first wireless device is configured not to transmit on said first network during the time period specified in the received first notification signal of the selected type.

17. The method of claim 16, further comprising abandoning a scheduled notification signal transmission by the first wireless device based on reception of the notification signal transmitted by the second wireless device.

18. The method of claim 16, further comprising scheduling a notification signal transmission by the first wireless device for a random time prior to a scheduled wireless transaction via the second transceiver.

19. The method of claim 16, further comprising:
receiving a timing signal via the first transceiver; and
synchronizing the timing of the transactions via the second transceiver based on the timing signal.

20. The method of claim 19, further comprising determining transmission times for the second transceiver based on the timing signal.

21. The method of claim 16, further comprising grouping a first plurality of wireless devices and grouping a second plurality of wireless devices, each grouping of devices configured for operation on the first and second networks; wherein wireless transactions via the second transceiver of devices in each grouping are affected only by a notification signal transmitted by a device in the same grouping.

22. The method of claim 16, further comprising the first transceiver of the wireless device transmitting a third notification signal of the selected type indicating a time period during which the second transceiver of the first wireless device will perform a third wireless transaction, wherein the first transaction, the second transaction, and the third transaction is a WPAN transaction, and wherein a second transceiver of a another wireless device transmits a fourth wireless transaction via the second wireless network without transmitting a fourth notification signal of the selected type over the first wireless network.

23. The method of claim 16, wherein the selected notification signals are all CTS to self frames transmitted over the first network, and wherein the first network is a WLAN.

24. The method of claim 16, wherein the first wireless network uses the first transceiver to broadcast on a WLAN, and the second wireless network uses the second transceiver to broadcast on a Bluetooth network.

25. The method of claim 16, wherein the first wireless transaction is a Bluetooth transaction, and the second wireless transaction is also a Bluetooth transaction.

26. The method of claim 16, wherein the second network employs a frequency hopping spread spectrum technique to help lessen a possibility of collisions between wireless transmissions.

27. A wireless device, comprising:
a first wireless transceiver configured for communication via a first wireless network;
a second wireless transceiver configured for communication via a second wireless network, the first wireless network and the second wireless network employing adjacent and/or overlapping portions of the wireless spectrum, wherein the first wireless network is incompatible with the second wireless network; and
an arbiter that controls which of the first and second transceivers is enabled to transmit at a given time;
wherein the arbiter schedules wireless transactions via the second transceiver based on timing signals wirelessly received via the first transceiver from a different wireless device, the arbiter scheduled to:
a) during a time period as triggered by and based on receiving a first notification signal of a selected type over the first wireless network from a different wireless device also having a first wireless transceiver configured for operation with the first wireless network and a second wireless transceiver configured for operation with the second wireless network, the first notification signal indicates a time period during which the second transceiver of a different wireless device will perform a first wireless transaction;
b) wherein the wireless device is configured to perform a second wireless transaction via the second wireless network without transmitting a second notification signal of the selected type,
c) wherein the arbiter causes the second wireless transaction to occur only during the time period during which the second transceiver of the other device will perform the first wireless transaction as determined by the first wireless device from the first notification signal of the selected type, wherein the first transaction and the second transaction are wireless personal network transactions, and wherein the first network is a WLAN.

28. The wireless device of claim 27, wherein the arbiter schedules transmission of a notification signal indicative of an upcoming transaction using the second transceiver to occur at a random time prior to the upcoming transaction.

29. The wireless device of claim 28, wherein the second transceiver, following reception of the notification signal, is configured to perform transactions via the second network in synchronization with a second transceiver of a different wireless device.

30. The wireless device of claim 27, wherein the arbiter discards a pending notification signal transmission and schedules a new notification signal transmission based on wirelessly receiving a notification signal transmitted via the first network by the different wireless device.

31. The wireless device of claim 27, wherein the arbiter enables the second transceiver to perform a wireless transaction during a given time interval based on a notification signal wirelessly received by the first transceiver, the notification signal indicating that the different wireless device transmitting the notification signal will perform a wireless transaction on the second wireless network during the given time interval; and wherein communication via the first network conflicts with communication via the second network.

32. The wireless device of claim 27, wherein the logic causes the first transceiver to transmit a third notification signal of the selected type indicating a time period during which the second transceiver of the wireless device will perform a third wireless transaction, wherein the first transaction, the second transaction, and the third transaction is a Bluetooth transaction.

33. The wireless device of claim 27, wherein the selected notification signals are all CTS to self frames transmitted over the first network, wherein the first network is a WLAN.

34. The wireless device of claim 27, wherein the first wireless network uses the first transceiver to broadcast on a WLAN, and the second wireless network uses the second transceiver to broadcast on a Bluetooth network.

35. The wireless device of claim 27, wherein the first wireless transaction is a Bluetooth transaction, and the second wireless transaction is also a Bluetooth transaction.

* * * * *